United States Patent
Subramoni et al.

(10) Patent No.: US 10,965,563 B2
(45) Date of Patent: Mar. 30, 2021

(54) AUTOMATIC MONITORING OF THE HEALTH OF AN IDENTITY SERVICES ENGINE

(71) Applicant: Cisco Technology, Inc., San Jose, CA (US)

(72) Inventors: Nagappan Subramoni, Bangalore (IN); Anil Kumar Tappetla, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 172 days.

(21) Appl. No.: 15/928,826

(22) Filed: Mar. 22, 2018

(65) Prior Publication Data
US 2019/0296993 A1    Sep. 26, 2019

(51) Int. Cl.
*H04L 12/26* (2006.01)
*H04L 12/24* (2006.01)
*H04L 29/06* (2006.01)

(52) U.S. Cl.
CPC ............ *H04L 43/08* (2013.01); *H04L 41/142* (2013.01); *H04L 63/0892* (2013.01)

(58) Field of Classification Search
CPC .... H04L 43/08; H04L 41/142; H04L 63/0892
USPC ........................................................ 709/224
See application file for complete search history.

(56) References Cited

U.S. PATENT DOCUMENTS

| | | | |
|---|---|---|---|
| 9,667,658 B2 | 5/2017 | Sundaram | |
| 9,753,796 B2 | 9/2017 | Mahaffey et al. | |
| 2003/0061340 A1* | 3/2003 | Sun | H04L 43/00 709/224 |
| 2017/0010931 A1* | 1/2017 | Agarwal | G06F 11/0727 |
| 2017/0041343 A1 | 2/2017 | Wong et al. | |
| 2017/0111233 A1* | 4/2017 | Kokkula | H04L 41/0823 |
| 2017/0237747 A1 | 8/2017 | Quinn et al. | |

OTHER PUBLICATIONS

Cisco: "Cisco Identity Services Engine User Guide, Release 1.1.x", https://www.cisco.com/c/en/us/td/docs/security/ise/1-1-1/user_guide/ise_user_guide.pdf (Year: 2017).*
Cui et al. "A New Anomaly Detection System for School Electricity Consumption Data", file:///C:/Users/pngankam/Downloads/information-08-00151-v2.pdf (Year: 2017).*
(Continued)

*Primary Examiner* — Aftab N. Khan
*Assistant Examiner* — Patrick F Ngankam
(74) *Attorney, Agent, or Firm* — Edell, Shapiro & Finnan, LLC

(57) ABSTRACT

A system and method for monitoring the health of an identity services engine (ISE) system is disclosed. The method includes obtaining, from a plurality of ISE nodes within an ISE system, historical performance metrics for the plurality of ISE nodes; computing, based on the historical performance metrics, a model for the plurality of ISE nodes representing healthy behavior for the plurality of ISE nodes; obtaining, from the plurality of ISE nodes, real-time performance metrics for the plurality of ISE nodes; comparing the real-time performance metrics for the plurality of ISE nodes to the model for the plurality of ISE nodes; determining, based on the comparing, a health of the plurality of ISE nodes; and configuring the ISE system to route network traffic away from unhealthy ISE nodes.

20 Claims, 8 Drawing Sheets

(56) References Cited

OTHER PUBLICATIONS

Cisco "Cisco Identity Service Engine User Guide: Monitoring and Troubleshooting, Release 1.1.x", file:///C:/Users/pngankam/Downloads/mafiadoc.com_cisco-identity-services-engine-user-guide-release-5a_1d58491723ddb8455e466d.pdf (Year: 2017).*
Cui,"A New Anomaly Detection System for School Electricity Consumption Data" https://www.mdpi.com/2078-2489/8/4/151 (Year: 2017).*
"Understanding the ISE Server Deployment", Cisco Identity Services Engine Appliance Hardware Installation Guide 1.0, Beta Draft—Cisco Confidential, OL-22971-01, downloaded from the internet on Mar. 14, 2018, 8 pgs.
Florbäck, "Anomaly Detection in Logged Sensor Data", Chalmers, Master's thesis in Complex Adaptive Systems, Department of Applied Mechanics, Jan. 2015, 52 pgs.
The Wikipedia Guide, "Introduction to Machine Learning", Data Science Association, Nov. 30, 2017, 456 pgs.
AzureML Team for Microsoft, "Anomaly Detection", Machine Learning API, https://gallery.azure.ai/MachineLearningAPI/Anomaly-Detection-2, Apr. 22, 2015, 4 pgs.
Lim, et al., "A Log Mining Approach to Failure Analysis of Enterprise Telephony Systems", IEEE, DSN 2008, International Conference on Dependable Systems & Networks: Anchorage, Alaska, Jun. 24-27, 2008, 6 pgs.
Tan, et al., "SALSA: Analyzing Logs as State Machines", Parallel Data Laboratory, CMU-PDL-08-111, Sep. 2008, 17 pgs.
Kim, et al., "ExNet: An Intelligent Network Management System", Department of Electrical Engineering and Computer Science, Department of Electrical and Computer Engineering, Conference: Proceedings of WebNet 98—World Conference on the WWW and Internet & Intranet, Orlando, Florida, USA, Nov. 7-12, 1998, 6 pgs.

* cited by examiner

700

```
┌─────────────────────────────────────────┐
│ OBTAIN, FROM A PLURALITY OF IDENTITY    │  702
│ SERVICES ENGINE (ISE) NODES WITHIN AN   │
│ ISE SYSTEM, HISTORICAL PERFORMANCE      │
│ METRICS FOR THE PLURALITY OF ISE NODES  │
└─────────────────────────────────────────┘
                    │
                    ▼
┌─────────────────────────────────────────┐
│ COMPUTE, BASED ON THE HISTORICAL        │  704
│ PERFORMANCE METRICS, A MODEL FOR THE    │
│ PLURALITY OF ISE NODES REPRESENTING     │
│ HEALTHY BEHAVIOR FOR THE PLURALITY OF   │
│ ISE NODES                               │
└─────────────────────────────────────────┘
                    │
                    ▼
┌─────────────────────────────────────────┐
│ OBTAIN, FROM THE PLURALITY OF ISE NODES,│  706
│ REAL-TIME PERFORMANCE METRICS FOR THE   │
│ PLURALITY OF ISE NODES                  │
└─────────────────────────────────────────┘
                    │
                    ▼
┌─────────────────────────────────────────┐
│ COMPARE THE REAL-TIME PERFORMANCE       │  708
│ METRICS FOR THE PLURALITY OF ISE NODES  │
│ TO THE MODEL FOR THE PLURALITY OF ISE   │
│ NODES                                   │
└─────────────────────────────────────────┘
                    │
                    ▼
┌─────────────────────────────────────────┐
│ DETERMINE, BASED ON THE COMPARING, A    │  710
│ HEALTH OF THE PLURALITY OF ISE NODES    │
└─────────────────────────────────────────┘
                    │
                    ▼
┌─────────────────────────────────────────┐
│ CONFIGURE THE ISE SYSTEM TO ROUTE       │  712
│ NETWORK TRAFFIC AWAY FROM UNHEALTHY     │
│ ISE NODES                               │
└─────────────────────────────────────────┘
```

FIG.7

AUTOMATIC MONITORING OF THE HEALTH OF AN IDENTITY SERVICES ENGINE

TECHNICAL FIELD

The present disclosure relates to managing an Identity Services Engine (ISE).

BACKGROUND

An Identity Services Engine (ISE) is a network access control system that may be used for authentication, authorization, and accounting (AAA). AAA is a process for controlling access to network resources, enforcing network policies, and auditing usage of the network resources. Authentication may provide a way of identifying a user of a device by, for example, determining that the user has provided a valid user name and an associated password before granting access to the network resources. If the provided user name and associated password match credentials stored in, for example, a database, then the user is granted access to the network resources. After successful authentication, the ISE may determine which commands or instructions for which the user is authorized. Accounting measures an amount of network resources the user consumes during network access.

BRIEF DESCRIPTION OF THE DRAWINGS

FIG. 7 is a flowchart depicting a method for monitoring the health of an ISE, according to an example embodiment.

DESCRIPTION OF EXAMPLE EMBODIMENTS

Overview

Briefly, a system and method for monitoring the health of an ISE system is disclosed. Historical performance metrics of ISE nodes within an ISE system are obtained. Based on these historical performance metrics, the health monitoring system computes a model that represents a healthy ISE system. The health monitoring system then obtains real-time performance metrics of the ISE system. The real-time performance metrics are compared to the computed model to determine if the ISE system is healthy, deteriorating in health, or unhealthy. The health monitoring system may make this determination based on how well the real-time performance metrics fit with the historical performance metrics. When the health monitoring system determines that one or more ISE nodes is unhealthy, the health monitoring system configures the ISE system to route traffic away from the unhealthy ISE nodes.

Example Embodiments

Figure 1:
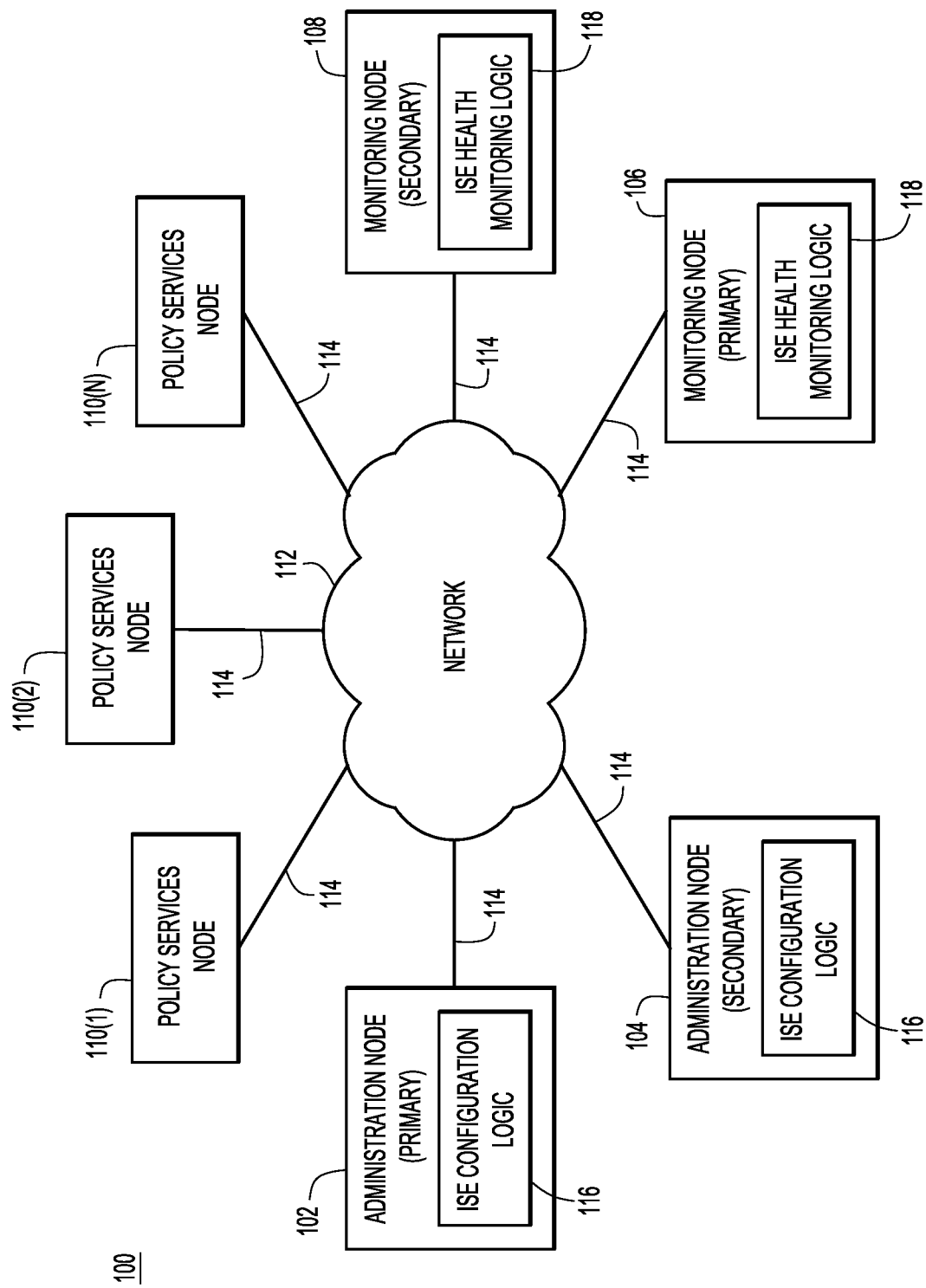
FIG. 1 is a block diagram of an ISE system, according to an example embodiment.

With reference made to FIG. 1, a deployment of an ISE system 100 is shown, according to an example embodiment. The ISE system 100 includes a primary administration node 102, a secondary administration node 104, a primary monitoring node 106, a secondary monitoring node 108, and one or more policy services nodes (PSNs) 110(1)-110(N). The primary administration node 102, the secondary administration node 104, the primary monitoring node 106, the secondary monitoring node 108, and the one or more PSNs 110(1)-110(N) may communicate with each other via network 112 over communication links 114. The communication links 114 may be wired communication links, wireless communication links, or a combination of wired and wireless communication links.

The primary monitoring node 106 and the secondary monitoring node 108 may each store and run ISE health monitoring logic 118. The operation of ISE health monitoring logic 118 is described in more detail herein. During operation of the ISE system 100, the primary monitoring node 106 may be an active monitoring node that processes and stores performance metrics received from other nodes within the ISE 100, such as the PSNs 110(1)-110(N), and the secondary monitoring node 108 may be a backup monitoring node. In other words, during operation of the ISE system 100, if the primary monitoring node 106 were to fail or otherwise become unavailable, the secondary monitoring node 108 may automatically become the active monitoring node. The ISE health monitoring logic 118 of the secondary monitoring node 106 may receive the same authentication, authorization, and accounting (AAA) flows as the ISE health monitoring logic 118 of the primary monitoring node 108.

The primary administrative node 106 and the secondary administrative node 108 may each store ISE configuration logic 116. The operations of the ISE configuration logic 116 are described in more detail herein. During operation of the ISE system 100, the primary administration node 102 may be an active administration node that processes the AAA flows and the secondary administration node 104 may be a backup administration node. In other words, during operation of the ISE 100, if the primary administration node 102 were to fail or otherwise become unavailable, the secondary administration node 104 becomes the active administration node via a manual promotion. The ISE configuration logic 116 of the secondary administrative node 104 may receive the same ISE configurations as the ISE configuration logic 116 of the primary administrative node 102.

The primary administration node 102 and the secondary administration node 104 may perform administration operations in the ISE system 100. For example, they process configurations related to the AAA process. The primary monitoring node 106 and the secondary monitoring node 108 serve as log collectors and store log messages from the plurality of PSNs 110(1)-110(N). The primary monitoring node 106 and the secondary monitoring node 108 may process, via the ISE health monitoring logic 118, data in the collected logs to generate a health analysis of the ISE system 100, as described herein. The one or more PSNs 110(1)-110(N) may provide access, posture, guest access, client provisioning, and profiling services to endpoints (shown in FIG. 2).

Figure 2:
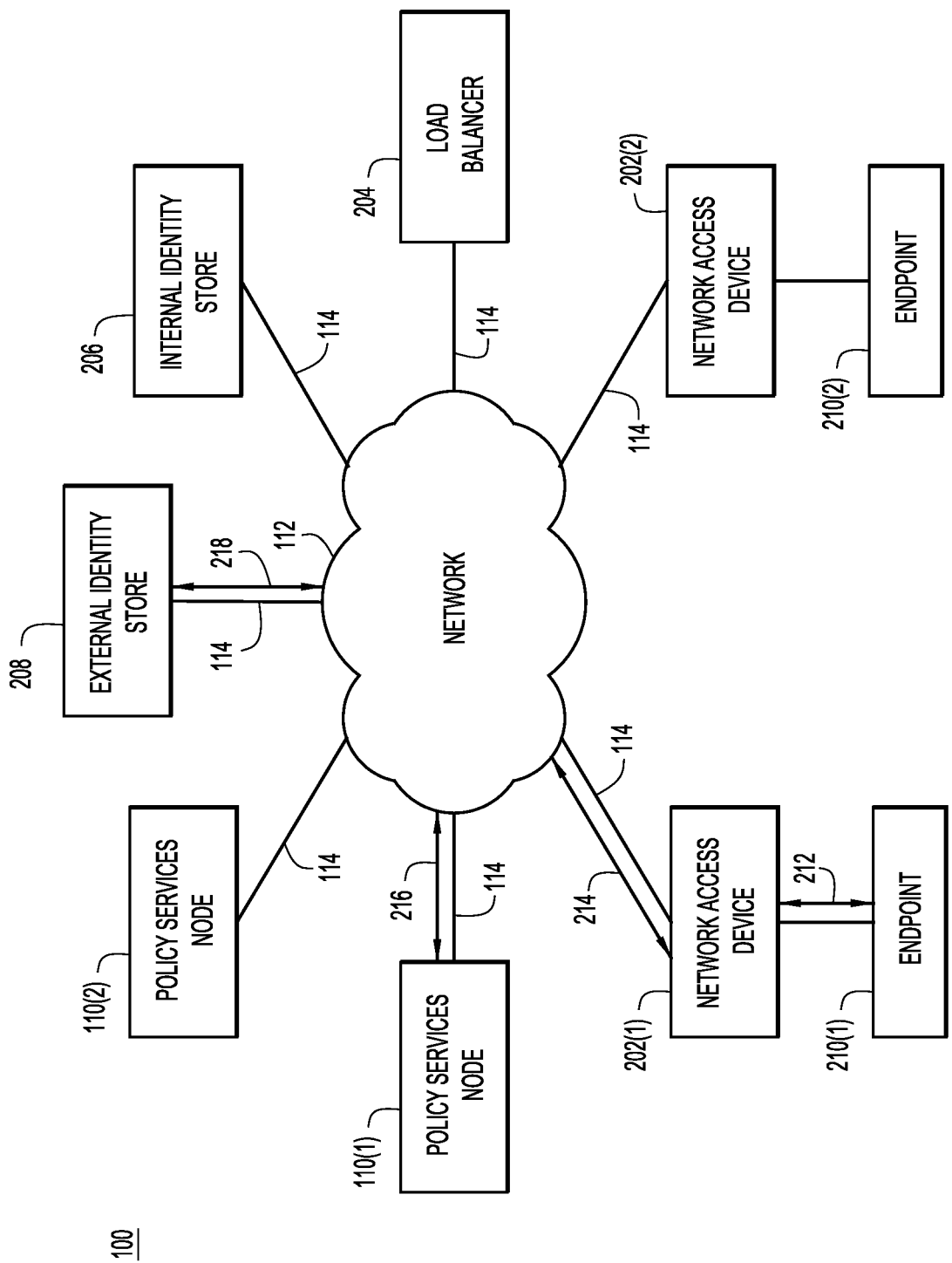
FIG. 2 is a block diagram of a system for processing an AAA request, according to an example embodiment.

Turning to FIG. 2, and with continuing reference to FIG. 1, a block diagram of system 100 for processing an AAA request is shown, according to an example embodiment. In this example, the system 100 includes two PSNs 110(1), 110(2). The system 100 also includes a first network access device (NAD) 202(1), a second NAD 202(2), a load balancer 204, an internal identity store 206, and an external identity store 208. Additionally, a first endpoint 210(1) is connected to the first NAD 202(1) and a second endpoint 210(2) is connected to the second NAD 202(2). It should be appreciated that any number of PSNs, NADs, load balancers, internal identity stores, external identity stores, and endpoints may be included within the system 100. The two PSNs 110(1), 110(2), the two NADs 202(1), 202(2), the load balancer 204, the internal identity store 206, the external identity store 208, and the two endpoints 210(1), 210(2) may communicate with each other via the network 112 via communication links 114.

As an example, endpoint 210(1) may send a request to NAD 202(1) to gain access to a network. The request may include, for example, a user name and an associated password. The NAD may forward the request to the load balancer 204, which load balances the request among the PSNs 110(1), 110(2) and may forward the request to PSN 110(1), for example. PSN 110(1) may then communicate with the internal identity store 206 and/or the external identity store 208 to determine whether the user name and associated password in the request match a user name and password pair in the internal identity store 206 and/or the external identity store 208. If there is a match, then the PSN 110(1) may send to the endpoint 210(1), via the NAD 202(1), a message granting access to the requested network to the endpoint 210(1).

The NADs 202(1), 202(2) may be any device used to connect the endpoints 210(1), 210(2) to the network 112 and/or the requested network. For example, the NADs 202(1), 202(2) may be a router, switch, gateway, access point, etc. As described above, the load balancer 204 may load balance requests received from the NADs 202(1), 202(2) among the PSNs 110(1), 110(2). The internal identity store 206 may be an identity store that is internal to the ISE system 100 while the external identity store 208 may be an identity store that is external to the ISE system 100. The internal identity store 206 and the external identity store 208 may be, for example, databases storing authentication information, such as user name and password pairs. As described above, the internal identity store 206 and the external identity store 208 may communicate with the PSNs 110(1), 110(2) to determine if there is a match between the received user name and password and the user names and passwords stored in the internal identity store 206 and/or the external identity store 208. The external identity store 208 may be, for example, a mobile device management (MDM) server, a Rivest-Shamir-Adleman (RSA) one-time password (OTP) server, or an Active Directory (AD).

The ISE system 100 may include one or more circuits. A circuit may identified as a path a request takes to authorize an endpoint into the network. In other words, a circuit may identify an access flow or may be a unique signature that identifies a distinct access flow involving various network elements, such as NADs 202(1), 202(2), PSNs 110(1), 110(2), and an external identity store 208 and/or an internal identity store 206, participating in controlling access to an endpoint, such as endpoint 210(1). For example, a circuit is identified in FIG. 2 by the arrows 212, 214, 216, and 218, which form a path from endpoint 210(1) to NAD 202(1) to PSN 110(1) to external identity store 208. Each unique combination of nodes may be identified as a distinct circuit.

The PSNs 110(1), 110(2) generate a plurality of performance metrics, which may be sent to the primary monitoring node 106 and the secondary monitoring node 108, each of which may store the performance metrics in a log. The ISE health monitoring logic 118 may analyze one or more of the performance metrics to determine the health of the ISE 100 or an individual circuit within the ISE system 100. The performance metrics may include a processor utilization, a memory utilization, a load average, disk input/output (I/O) operations, network utilization, including an amount of bytes sent and received over the network 112, and a number of authentication requests.

The processor utilization metric may be an average processor utilization in a given time interval. The memory utilization metric may be an average memory utilization in the given time interval. The load average metric represents a number of processes using or waiting for processor resources. For example, an idle processor would have a load average of zero. For each process using or waiting to use the processor, the load average is incremented by one. The disk I/O metric includes a number of input and output operations performed on a physical disk. The network utilization metric indicates an amount of data, such as a number of bytes, sent over the network 112. The number of authentication requests metric indicates a number of authentication requests received within the given time interval. For example, the number of authentication requests increases by one for each new authentication requests and resets to zero in a new time period. The authentication requests may include Remote Authentication Dial-In User Service (RADIUS) requests or Terminal Access Controller Access-Control System Plus (TACACS+) requests. The latency metric for the authentication requests is an average time elapsed to serve a particular authentication request.

In addition to these performance parameters, the PSNs 110(1), 110(2) may also track an authentication count, or a number of granted authentication requests.

Figure 3:
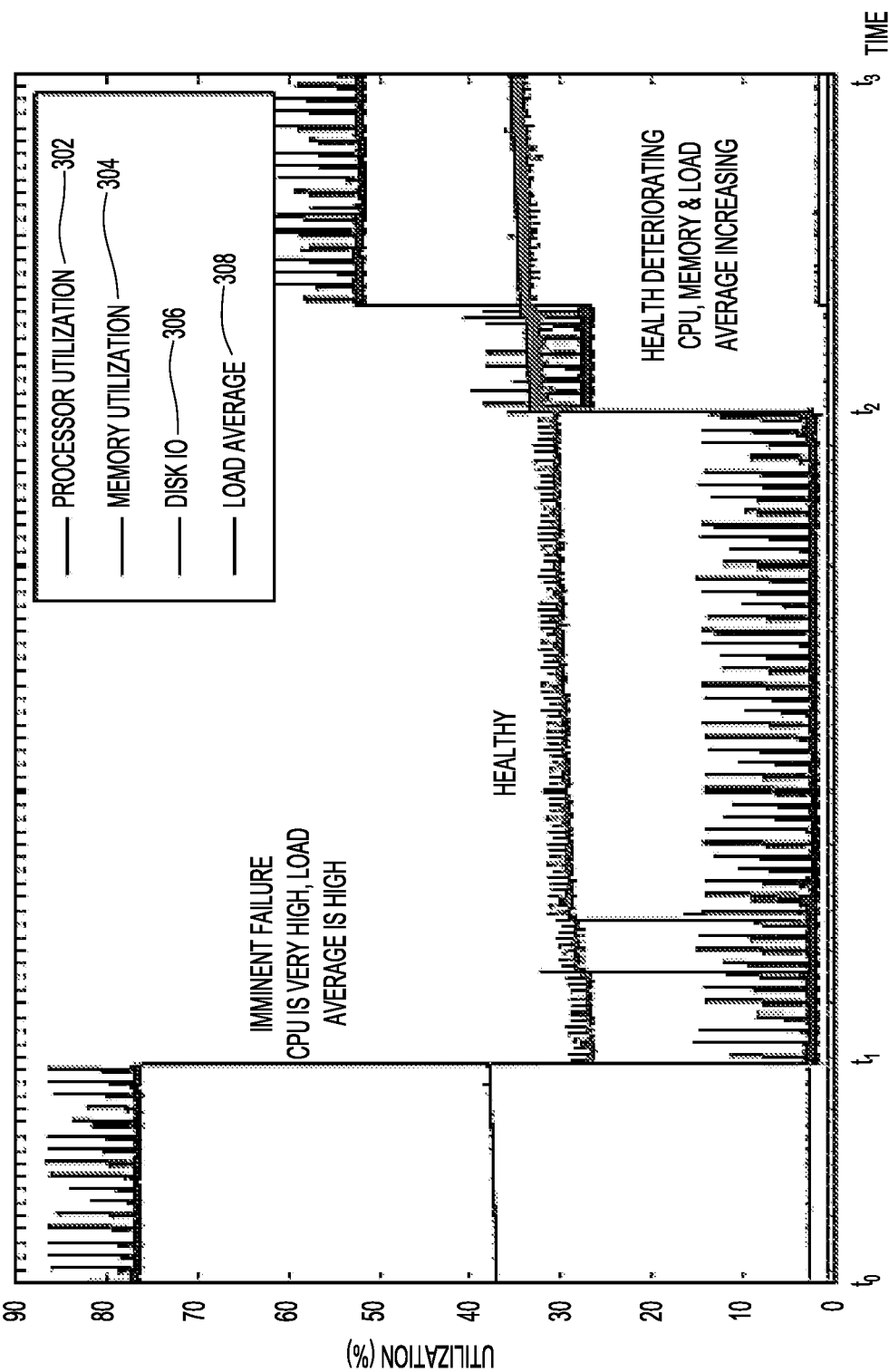
FIG. 3 is a data plot depicting the health status of an ISE system, according to an example embodiment.

Turning to FIG. 3, with continuing reference to FIGS. 1 and 2, FIG. 3 shows a data plot 300 depicting health status of ISE system 100, according to an example embodiment. The plot 300 has time as the independent variable along the x axis and utilization, expressed as a percentage, of performance metrics as the dependent variable along the y axis. The performance metrics included in the plot 300 are the processor utilization 302, memory utilization 304, disk I/O operations 306, and load average 308. The plot 300 also depicts three time periods: from time $t_0$ to $t_1$, from time $t_1$ to $t_2$, and from time $t_2$ to $t_3$.

From time $t_0$ to $t_1$, the ISE health monitoring logic 118 may determine that ISE system 100 is unhealthy because of the values for the plotted performance metrics. For example, the processor utilization 302 has a relatively high value, ranging from approximately 75% to 85% during this time period. Additionally, the load average 308 is also relatively high for this period, being approximately 4% through this time period. Moreover, the memory utilization 304 is also relatively high, approximately 38% during this time period. Because these performance metrics have a relatively high utilization, the ISE health monitoring logic 118 may determine that the ISE system 100 is in an unhealthy state. Based on this determination, the ISE health monitoring logic 118 may configure the ISE system 100 to route network traffic away from unhealthy ISE nodes, as described in more detail herein.

From time $t_1$ to $t_2$, the ISE health monitoring logic 118 may determine that the ISE system 100, based on the performance metrics, is healthy. In contrast to time $t_0$ to $t_1$, the processor utilization 302, the memory utilization 304, the disk I/O 306, and the load average 308 do not have relatively high utilization values. Therefore, the ISE health monitoring logic 118 may determine that the ISE system 100 is in a healthy state.

From time $t_2$ to $t_3$, the ISE health monitoring logic 118 may determine that that the health of the ISE system 100, based on the performance metrics, is deteriorating. As shown, the processor utilization 302 has significantly increased from the time $t_1$ to $t_2$. The processor utilization 302 first increases to approximately 30%, and then to approximately 55%. Moreover, the memory utilization 304 and the load average 308 have also increased in this time period. Based on these changes to the metrics, the ISE health monitoring logic 118 may determine that the health of the ISE system 100 is deteriorating.

The ISE health monitoring logic 118 may determine the health of ISE system 100 from a plurality of perspectives. A first perspective may determine the health of the ISE system 100 as a whole. In this aspect, the health monitoring logic 118 may first obtain historical performance metrics from each PSN within the ISE system 100. In addition to the historical performance metrics, the ISE health monitoring logic 118 may obtain an authentication count for each PSN. The historical performance metrics and the authentication count may be obtained from logs stored at the primary monitoring node 106(1). The historical performance metrics may be used as training data for generating a model of healthy behavior of the ISE system 100. For example, there is a $2^{nd}$ degree polynomial relationship between the authentication count and the performance parameters described above. Therefore, the ISE health monitoring logic 118 may linearly combine the performance metrics and perform linear regression on the combined performance metrics to generate a $2^{nd}$ degree polynomial to model healthy behavior of the ISE system 100. The linear combination of historical performance metrics may include a value for each performance metric, a value for the effect one performance metric has on another performance metric (an interaction component), and a bias value.

After the ISE health monitoring logic 118 has computed the $2^{nd}$ degree polynomial, the ISE health monitoring logic 118 may use real-time performance metrics of each PSN within a given time period. These real-time performance metrics may also be obtained at logs stored at the primary monitoring node 106(1). The ISE health monitoring logic 118 may compare the set of real-time performance metrics to the computed $2^{nd}$ degree polynomial. If the set of real-time performance metrics sufficiently conforms, or fits, to the computed $2^{nd}$ degree polynomial, then the ISE health monitoring logic 118 may determine that the ISE system 100 is healthy. For example, the ISE health monitoring logic 118 may determine if the set of real-time performance metrics sufficiently conforms to the $2^{nd}$ degree polynomial by computing an $R^2$ value, which indicates how well the set of real-time performance metrics conforms or fits to the computed $2^{nd}$ degree polynomial. If the value of $R^2$ is greater than or equal to 0.9, for example, the ISE health monitoring logic 118 may determine that the set of real-time performance metrics sufficiently conforms or fits to the computed $2^{nd}$ degree polynomial. In contrast, if the value of $R^2$ is less than 0.9, then the ISE health monitoring logic 118 may determine that the set of real-time performance metrics does not sufficiently conform or fit to the computed $2^{nd}$ degree polynomial. In other words, the value of $R^2$ determines the bounds of acceptable deviation in the set of real-time performance metrics. In the case where $R^2$ is less than 0.9, the ISE health monitoring logic 118 compares the set of real-time performance metrics to these bounds. In this case, the ISE health monitoring logic 118 may determine that the health of the ISE system 100 is deteriorating or failing. The ISE health monitoring logic 118 may determine that the ISE system 100 is in an unhealthy state depending on an amount of time that the set of real-time performance metrics does not conform or fit to the computed $2^{nd}$ degree polynomial. For example, a predetermined time period may be specified for an unhealthy ISE. If the set of real-time performance metrics does not conform or fit to the computed $2^{nd}$ degree polynomial for the predetermined time period or longer, then the ISE health monitoring logic 118 may determine that the ISE system 100 is failing. In contrast, if the set of real-time performance metrics does not conform or fit to the $2^{nd}$ degree polynomial for a time less than the predetermined time period, the ISE health monitoring logic 118 may determine that the health of the ISE system 100 is deteriorating.

In a second perspective, the ISE health monitoring logic 118 may determine the health of an individual circuit within the ISE system 100. The ISE health monitoring logic 118 uses the parameters discussed above in connection with monitoring the health of the ISE 100 and a circuit latency parameter. Because attributes, such as circuit request rate, are not collected at the PSNs, the health of a circuit cannot be established as when monitoring the health of the ISE system 100.

Therefore, the ISE health monitoring logic 118 may generate an n-dimensional hyperspace based on the processor utilization, a memory utilization, a load average, disk input/output (I/O) operations, network utilization, including an amount of bytes sent and received over the network 112, a number of authentication requests, and a circuit latency for the authentication requests. The number of dimensions, n, is based on the number of performance metrics. A real-time performance metric that is within the area enclosed by the n-dimensional hyperspace indicates a healthy circuit while a real-time performance metric that is outside of the area enclosed by the n-dimensional hyperspace indicates an unhealthy circuit.

Each data point of the historical performance metrics and the real-time performance metrics may be represented by a tuple $(r, a_1, a_2, a_3, \ldots a_{n-1})$, where r is a length of the vector and $a_1, a_2, a_3, \ldots a_{n-1}$ are the angles swept with respect to each axis. The angles for $a_1, a_2, a_3, \ldots a_{n-2}$ are swept between 0 and $\pi$ and the angle $a_{n-1}$ is swept between 0 and $2*\pi$. In this embodiment, $\pi$ is in radians.

The hyperspace may be swept at certain angle intervals, such as 45° intervals. For example, in a three dimensional space, data points may lie along the following intervals (0, 0), (0, 45), (45, 45), (45, 0), etc. assuming a 45° interval. The historical performance metrics may be used to identify points along these directions to form the hyperspace. The point along each respective direction that is farthest from the origin represents a point on the hypersurface. If a point along a direction does not exist, then the ISE health monitoring logic 118 may find a closest neighbor point. The closest neighbor point may be at an angle that deviates from the given angle by an angle that is insignificant compared to the interval angle used to sweep the hyperspace. If a point cannot be found within this deviation, then a null value may be inserted to connect the points. By connecting the points of each angle swept, the hyperspace representing healthy operation of a circuit in the ISE system 100 is formed.

The formed hyperspace may be mathematically simplified to reduce the complexity of the computation of the health of a circuit in the ISE system 100. For example, a transformation may be applied to the formed hyperspace. For a given axis, the transformed hyperspace may be swept by a point vector by an angle incremented by d, where d is a fraction of $\pi$. By incrementing the swept angle by d, and without repeating an angle for the given axis, the ISE health monitoring logic 118 may sweep through an entire surface. The ISE health monitoring logic 118 performs a similar sweep for each axis, thereby sweeping the entire transformed hyperspace. The points indicated at each angle swept may be consecutively connected, thereby dividing a portion of the hyperspace into n−1 hypersurfaces that form the portions of the hyperspace. Each increment by angle d represents a hypersurface that approximates the swept area of the transformed hyperspace. The hypersurfaces are joined. Therefore, the smaller the value of d, the more the joined hypersurfaces approximate the hyperspace.

For example, when the hyperspace is a hypersphere, a start point of the hypersphere may be represented by the tuple $(r, a_1, a_2, \ldots a_{n-1})$. By applying the transformation described above, the ISE health monitoring logic 118 may compute n−1 directions at each data point. The ISE health monitoring logic 118 may then navigate in the n−1 directions at each data point. Because an angle is not repeated for a given axis, the end point when traversing a path connecting data points after each transformation may be represented by the tuple $(r, a_{1+d}, a_{2+d}, \ldots a_{n-1+d})$. When the start point and the end point are connected, the portion of the original hypersphere is formed of adjacent sub-surfaces, which may all share a same edge. The ISE health monitoring logic 118 may sweep the entire hyperspace and split it into a plurality of connected regions. When data points are connected by hypersurfaces along which vectors connecting pairs of points lie, a region can be drawn in the hyperspace that corresponds to a healthy state.

Assuming that each hypersurface approximates a linear function, each hypersurface may be identified using linear regression. The linear function may be represented as $$y=[A]*[x]+B$$

where [x] is the set of data vectors in n dimensions, [A] represents the weight of each component in each vector, and B represents a bias.

When a vector for a real-time performance metric is determined, the ISE health monitoring logic 118 may use a corresponding enclosure of the hypersurface to determine whether the vector for the real-time performance metric protrudes through the hypersurface. For example, if the corresponding enclosure of the hypersurface is represented by f(x), then f(xr), where xr is the real-time performance metric, would have a value greater than or equal to zero if xr lied on or above the hypersurface. In other words, if the real-time performance metric protrudes through the hypersurface, f(xr) has a positive value, which indicates that the circuit is unhealthy or deteriorating.

Similar to determining the health of the ISE system 100 described above, the ISE health monitoring logic 118 may determine the health of a circuit based on how long the real-time performance metrics of a circuit is outside the bounds of the hypersurface. For example, a predetermined time period may be set and if the real-time performance metric of the circuit is outside the bounds of the hypersurface for at least the predetermined time period, the ISE health monitoring logic 118 may determine that the circuit is unhealthy. In contrast, if the real-time performance metric of the circuit is outside the bounds of the hypersurface for less than the predetermined time period, the ISE health monitoring logic 118 may determine that the health of the circuit is deteriorating. If the real-time performance metric of the circuit is within the bounds of the hyperspace, then the ISE health monitoring logic 118 may determine that the circuit is healthy.

Figure 4:
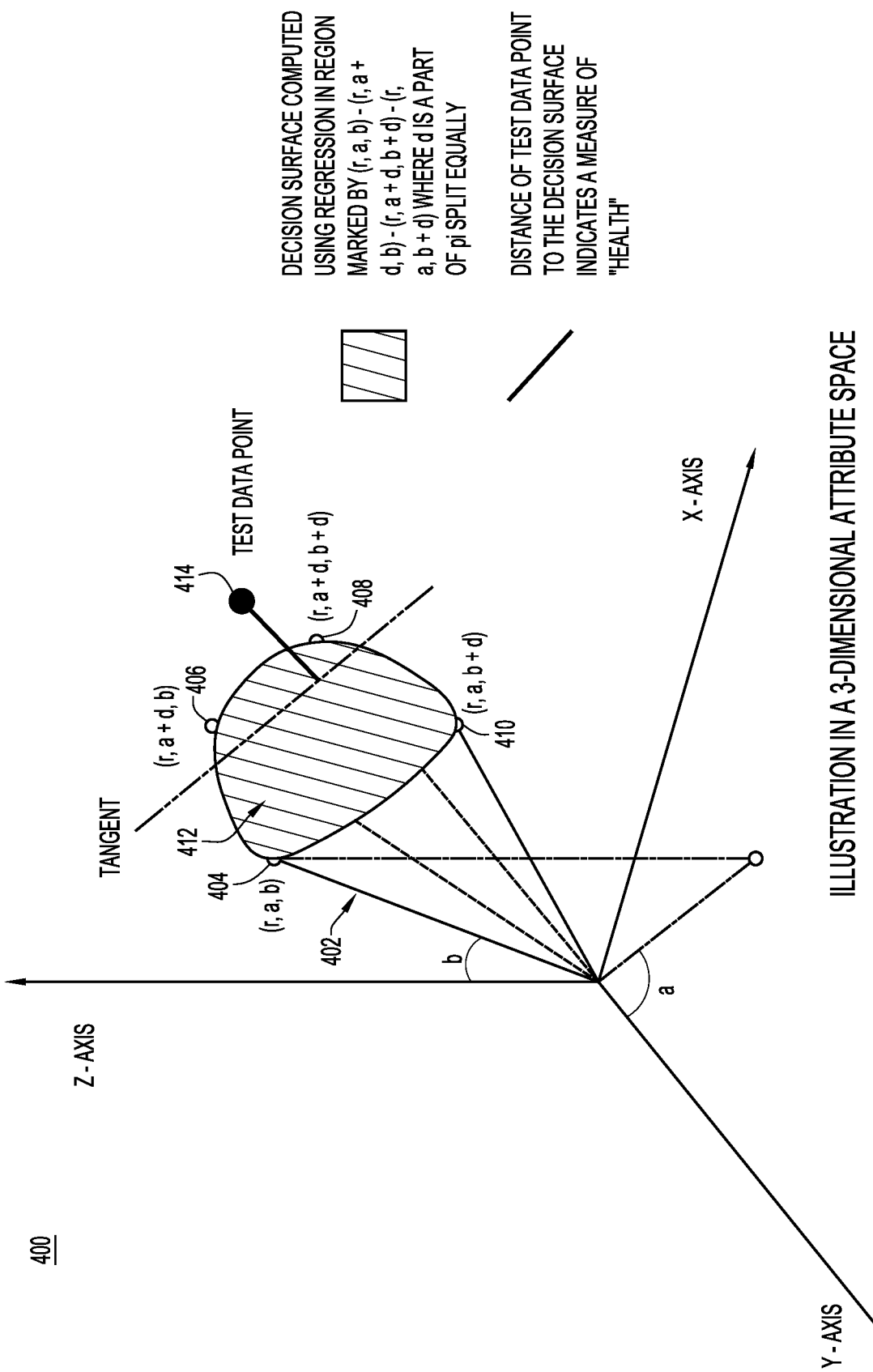
FIG. 4 is a plot of ISE health status data in a three dimensional space, according to an example embodiment.

FIG. 4 is a plot 400 of ISE health status in a three dimensional space, according to an example embodiment. The plot 400 includes x, y, and z axes and a vector (r, a, b) 402 in expressed spherical coordinates. As shown, the angles a and b are incremented by the angle d to form a hypersurface. For example, the point 404 corresponding to vector (r, a, b) 402 may be the initial point. The angle a may be incremented by angle d to form point 406. The angles a and b may be incremented by angle d to form point 408. The angle b may be incremented by angle d to form point 410. A hypersurface 412 is formed by a surface defined by points 404, 406, 408, 410. Also shown in FIG. 4 is a real-time performance metric data point 414 that protrudes through the hypersurface 412. Therefore, the ISE health monitoring logic 118 may determine that the circuit is unhealthy or that the health of the circuit is deteriorating, as described above.

In another aspect, the ISE health monitoring logic 118 may determine the health of each step within a circuit. The ISE health monitoring logic 118 may use a probability distribution of each step for a given circuit. This probability distribution may be mixed across all ISE nodes within the ISE system 100 using a mixture distribution. Mixture distributions may indicate potential healthy latencies for a step, when taken at a predetermined confidence level, such as 95%. A deviation of step latency at a given confidence level may indicate a deteriorating or unhealthy step.

Figure 5:
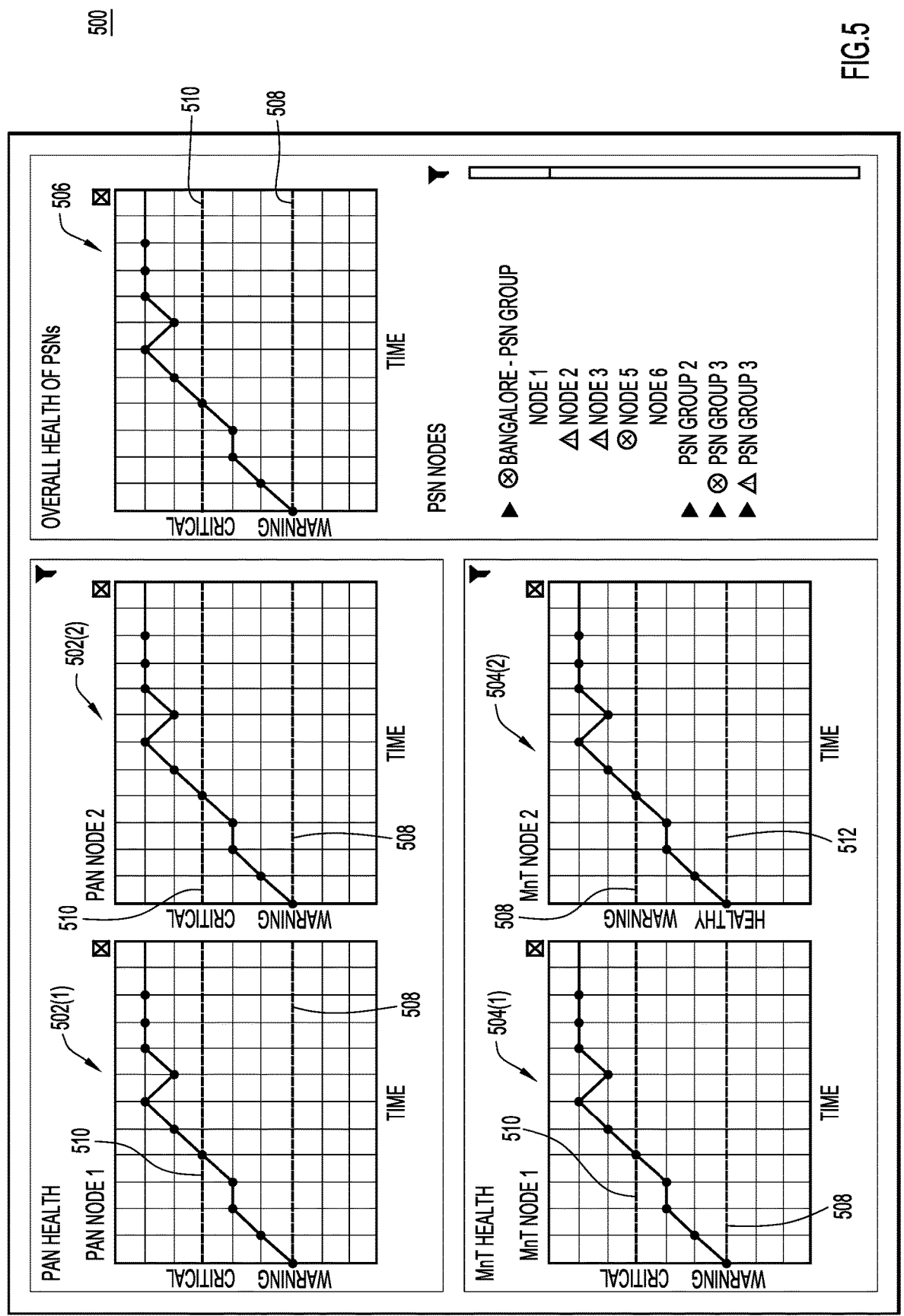
FIG. 5 is a graphical user interface presenting ISE health status data, according to an example embodiment.

Turning to FIG. 5, a graphical user interface (GUI) 500 presenting information about the health of an ISE system is shown, according to an example embodiment. The GUI 500 plots the health of a variety of ISE nodes, such as first and second policy administration nodes (PANs) plots 502(1), 502(2), first and second monitoring and troubleshooting node (MnTs) plots 504(1), 504(2), and the overall health of the PSNs plots 506 in the ISE system. For example, the first and second PANs may correspond to the primary administration node 102 and the secondary administration node 104, respectively. The first and second MnTs may correspond to the primary monitoring node 106 and the secondary monitoring node 108, respectively. The plots 502(1), 502(2), 504(1), 504(2), 506 plot health as a function of time. Plots 502(1), 502(2), 504(1), and 506, show two threshold lines: a warning line 508 and a critical line 510. The warning line 508 may correspond with a threshold for deteriorating health while the critical line 510 may correspond with a threshold for an unhealthy node. As shown in plots 502(1), 502(2), 504(1), and 506, the health for the respective nodes begins at the warning line 508 and continues to deteriorate over time. As the length of time that the health of the nodes are deteriorating reaches a predefined time, the ISE health monitoring logic 118 may determine that the nodes are unhealthy.

Plot 504(2) also shows a deterioration in health of the second MnT node. However, in this case, the plot 504(2) shows two threshold lines: the warning line 508 and a healthy line 512. Here, the health of the node deteriorates with time as well. The second MnT node is initially healthy but as time advances, the health of the node deteriorates, as shown in the plot 5024(2).

By displaying that the health of the ISE system 100 is deteriorating, the ISE health monitoring logic 118 enables a user to plan for a failure in the ISE system 100 rather than reacting to a failure. This technical advancement improves the operation of the ISE system 100 because effects of the failures within the ISE system 100 may be mitigated with any of a variety of actions, as described herein.

Figure 6:
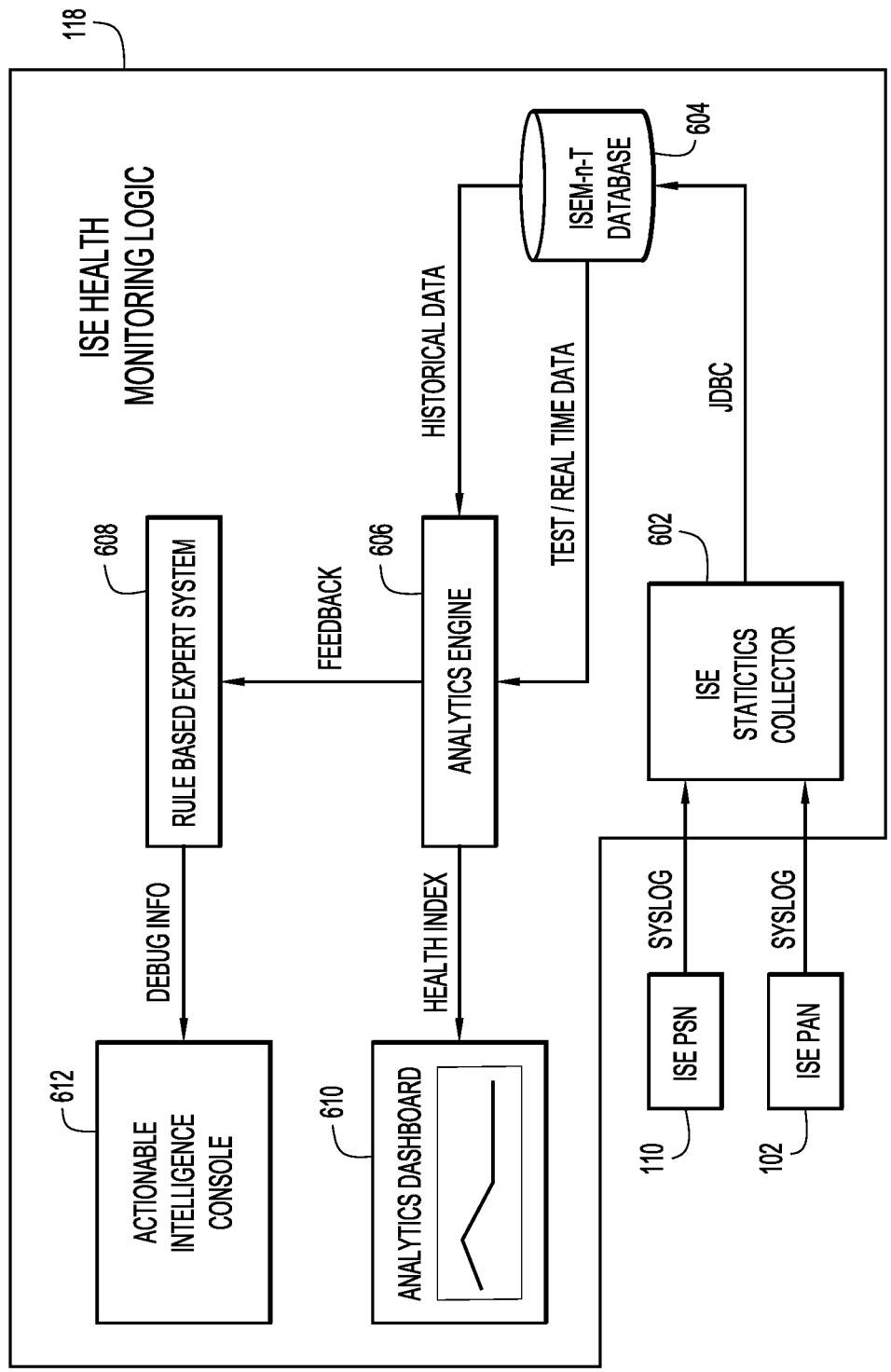
FIG. 6 is a functional block diagram of ISE health monitoring logic, according to an example embodiment.

Turning to FIG. 6, and with continuing reference to FIGS. 1-5, a functional block diagram of the ISE health monitoring logic 118 is shown, according to an example embodiment. The block diagram also includes a PSN 110 and the primary administrative node 102. The ISE health monitoring logic 118 includes a statistics collector 602, a database 604, an analytics engine 606, a rule-based expert system 608, an analytics dashboard 610, and an actionable intelligence console 612.

The statistics collector 602 collects performance metrics generated and sent by the various nodes within the ISE 100, such as PSN 110 and the primary administrative node 102. The performance metrics may be the metrics described above in connection with FIG. 3. The statistics collector 602 may process the received performance metrics and send the performance metrics to the database 604, which may store the performance metrics to be used for analysis. The database 604 sends both historical performance metrics and real-time performance metrics to the analytics engine 606. The analytics engine 606 may analyze the received performance metrics to determine the health of the ISE system 100, as described above. The analytics engine 606 may generate a health index indicating the health of the ISE system 100. The analytics engine 606 may send the health index to the analytics dashboard 610, which may be similar to the GUI 500 described above in FIG. 5. The analytics engine 606 may also send the health index to the rule-based expert system 608, which may recommend or take an action based on the health index. The recommended or taken action may be sent to the actionable intelligence console 612.

The rule-based expert system 608 may generate a configuration for the ISE system 100 when the ISE health monitoring logic 118 determines that a node within the ISE system 100 is deteriorating or is unhealthy. For example, if an external identity store, such as an Active Directory, fails, the rule-based expert system 608 may configure the ISE system to route network traffic away from the failed Active Directory. Rather, the rule-based expert system 608 may configure the ISE system 100 to route network traffic to a backup of the failed Active Directory. In another aspect, the rule-based expert system 608 may configure a load balancer to switch to a healthy PSN when the ISE health monitoring logic 118 determines that one of the PSNs is unhealthy. In another embodiment, the rule-based expert system 608 may configure the ISE system 100 to isolate a circuit that is causing a particular ISE node to melt. The rule-based expert system 608 may isolate the circuit by configuring the network to send all network traffic for the unhealthy circuit to a dedicated ISE node. In this manner, the rule-based expert system 608 protects other circuits from a larger failure.

Turning to FIG. 7, a flowchart depicting a method 700 for monitoring the health of an ISE is shown, according to an example embodiment. Reference is also made to FIGS. 1 and 2 for purposes of the description of FIG. 7. The method 700 may begin at operation 702, where the ISE health monitoring logic 118 of a monitoring node obtains, from one or more ISE nodes, historical performance metrics of the ISE nodes. For example, the ISE nodes may be one of the plurality of PSNs 110(1)-110(N) or the primary administration node 102 or the secondary administration node 104. The performance metrics may include the metrics described above in connection with FIG. 3. Moreover, the obtained performance metrics are historical rather than real-time.

At operation 704, the ISE health monitoring logic 118 of a monitoring node may compute, based on the historical performance metrics received in operation 702, a model for the ISE nodes representing healthy behavior of the ISE nodes. For example, the ISE health monitoring logic 118 of a monitoring node may compute a $2^{nd}$ degree polynomial relationship between authentication count and the historical performance metrics.

At operation 706, the ISE health monitoring logic 118 of a monitoring node obtains from the one or more ISE nodes, real-time performance metrics for the one or more ISE nodes.

At operation 708, the ISE health monitoring logic 118 of a monitoring node compares the real-time performance metrics obtained in operation 706 with the model computed in operation 704. For example, the ISE health monitoring logic 118 may determine how well the real-time performance metrics conform, or fit, with the computed model. The ISE health monitoring logic 118 may express how well the real-time performance metrics conform, or fit, with the computed model by an $R^2$ value. For example, an $R^2$ value equal to or greater than 0.9 may be considered be considered a good fit of the real-time performance metrics with the computed model. However, an $R^2$ value less than 0.9 may indicate that the real-time performance metrics do not fit well with the computed model.

At operation 710, the ISE health monitoring logic 118 of a monitoring node determines, based on the comparison in operation 708, the health of the one or more ISE nodes. For example, if the ISE health monitoring logic 118 determines, based on the $R^2$ value, that the real-time performance metrics conform well to the computed model, then the ISE health monitoring logic 118 may determine that the ISE nodes are healthy. However, if the ISE health monitoring logic 118 determines, based on the $R^2$ value, that the real-time performance metrics do not conform well to the computed mode, then the ISE health monitoring logic 118 may determine that the ISE nodes are not healthy.

At operation 712, the ISE health monitoring logic 118 of a monitoring node may configure the ISE to route network traffic away from unhealthy nodes. For example, the ISE health monitoring logic 118 may cause the primary administrative node 102 to configure a load balancer to reroute traffic from an unhealthy ISE node to a healthy ISE node. Or, the ISE health monitoring logic 118 may isolate a circuit causing an ISE node to be unhealthy so that all other circuits connected to the ISE node are unaffected.

Figure 8:
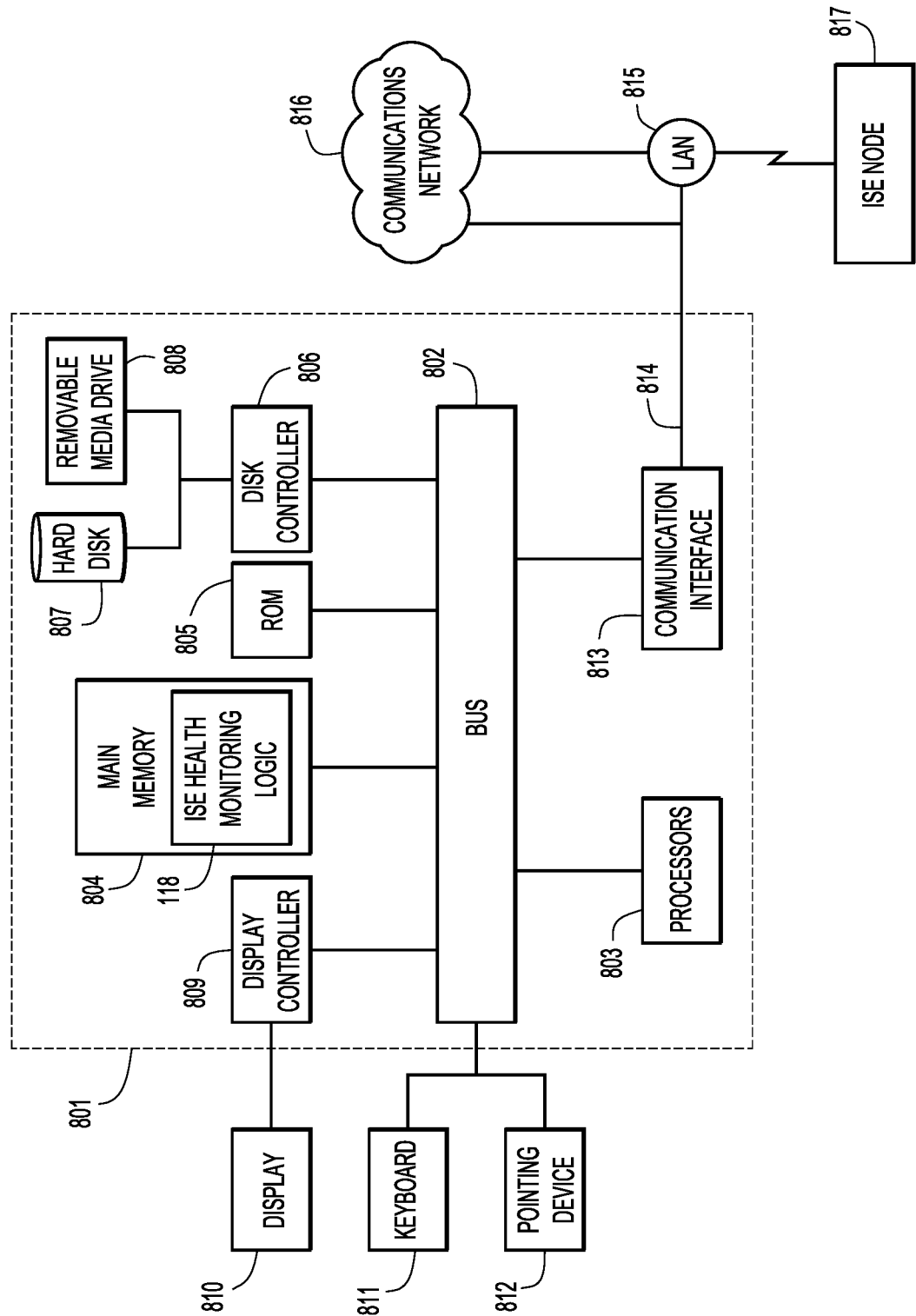
FIG. 8 is a block diagram of a server configured to monitor the health of an ISE system, according to an example embodiment.

FIG. 8 is a block diagram showing a server, e.g., primary monitoring node 106 shown in FIG. 1, configured to monitor the health of an ISE system, according to an example embodiment. FIG. 8 illustrates a computer system 801 upon which the embodiments presented may be implemented. The computer system 801 includes a bus 802 or other communication mechanism for communicating information, and a processor 803 coupled with the bus 802 for processing the information. While the figure shows a signal block 803 for a processor, it should be understood that the processors 803 represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803. For example, the main memory 804 stores instructions for the ISE health monitoring logic 118.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a liquid crystal display (LCD) or light emitting diode (LED) display, for displaying information to a computer user. The computer system 801 includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810.

The computer system 801 performs a portion or all of the processing steps of the process in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the process, and for enabling the computer system 801 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 maybe implemented in baseband signals, or carrier wave based signals. The computer system 801 can transmit and receive data, including program code, through the network(s) 815 and 816, the network link 814 and the communication interface 813. Moreover, the network link 814 may provide a connection through a LAN 815 to an ISE node 817 such as a PSN or an administrative node.

In summary, a method for monitoring health of an ISE is disclosed. The method includes obtaining, from a plurality of identity services engine (ISE) nodes within an ISE system, historical performance metrics for the plurality of ISE nodes; computing, based on the historical performance metrics, a model for the plurality of ISE nodes representing healthy behavior for the plurality of ISE nodes; obtaining, from the plurality of ISE nodes, real-time performance metrics for the plurality of ISE nodes; comparing the real-time performance metrics for the plurality of ISE nodes to the model for the plurality of ISE nodes; determining, based on the comparing, a health of the plurality of ISE nodes; and configuring the ISE system to route network traffic away from unhealthy ISE nodes.

The obtained historical performance metrics includes a processor utilization of an ISE node in the plurality of ISE nodes; a network utilization of an ISE node in the plurality of ISE nodes; an input or output disk utilization of an ISE node in the plurality of ISE nodes; a processor count of an ISE node in the plurality of ISE nodes; an average load of an ISE node in the plurality of ISE nodes; and a number of active authentication, authorization, and accounting (AAA) sessions of an ISE node in the plurality of ISE nodes.

In particular, computing the model includes performing a linear regression using a number of authentication requests and the historical performance parameters; and generating a second degree polynomial relationship based on the linear regression, wherein determining the health of the plurality of ISE nodes comprises: comparing the real-time performance metrics of the plurality of ISE nodes to the second degree polynomial relationship; and when the real-time performance metrics differs by more than a predetermined amount to the second degree polynomial relationship, determining that the plurality of ISE nodes are unhealthy.

In another aspect, when the historical performance metrics and the real-time performance metrics include latency, the method also generates, from the historical performance metrics, historical latency metrics for a circuit within the plurality of ISE nodes, the circuit identifying an access flow; computes, based on the historical latency metrics for the circuit, a model for the circuit representing healthy behavior for the circuit; obtains real-time latency metrics for the circuit; compares the real-time latency metrics for the circuit with the model for the circuit; determines, based on the comparing for the circuit, a health of the circuit; and when the circuit is determined to be unhealthy, isolates the circuit from remaining ISE nodes in the ISE system.

In another aspect, computing the model for the circuit further comprises generating a bounded region for the circuit, an area within the bounded region indicating a healthy circuit and an area outside the bounded region indicating an unhealthy circuit.

The method may also include generating a vector based on the real-time latency of the circuit; comparing the vector to the bounded region for the circuit; and when the vector of the circuit exceeds the bounded area of the circuit for a predetermined time period, determining that the circuit is unhealthy.

The method may also include generating a probability distribution of latency for each ISE node within the circuit; generating, based on the probability distribution function, a confidence level for each ISE node within the circuit; and when the real-time latency for an ISE node deviates by more than a predetermined amount from the confidence level, determining that the ISE node is unhealthy.

In another aspect, configuring the ISE network may also include routing network traffic from an unhealthy ISE node to a backup ISE node; and configuring a load balancer to route traffic from an unhealthy ISE node to a backup ISE node.

In another embodiment, an apparatus including a communication interface configured to enable network communications; a processing device coupled with the communication interface, and configured to: obtain, from a plurality of identity services engine (ISE) nodes within an ISE system, historical performance metrics for the plurality of ISE nodes; compute, based on the historical performance metrics, a model for the plurality of ISE nodes representing healthy behavior for the plurality of ISE nodes; obtain, from the plurality of ISE nodes, real-time performance metrics for the plurality of ISE nodes; compare the real-time performance metrics for the plurality of ISE nodes to the model for the plurality of ISE nodes; determine, based on the comparing, a health of the plurality of ISE nodes; and configure the ISE system to route network traffic away from unhealthy ISE nodes is disclosed.

In yet another embodiment, One or more non-transitory computer readable storage media encoded with instructions that, when executed by a processor, cause the processor to: obtain, from a plurality of identity services engine (ISE) nodes within an ISE system, historical performance metrics for the plurality of ISE nodes; compute, based on the historical performance metrics, a model for the plurality of ISE nodes representing healthy behavior for the plurality of ISE nodes; obtain, from the plurality of ISE nodes, real-time performance metrics for the plurality of ISE nodes; compare the real-time performance metrics for the plurality of ISE nodes to the model for the plurality of ISE nodes; determine, based on the comparing, a health of the plurality of ISE nodes; and configure the ISE system to route network traffic away from unhealthy ISE nodes is described.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining, from a plurality of identity services engine (ISE) nodes within an ISE system, historical performance metrics for the plurality of ISE nodes;
   computing, based on the historical performance metrics, a model for the plurality of ISE nodes representing healthy behavior for the plurality of ISE nodes, the model described by an n-dimensional hyperspace for a circuit within the plurality of ISE nodes, where n represents a number of the historical performance metrics;
   obtaining, from the plurality of ISE nodes, real-time performance metrics for the plurality of ISE nodes;
   generating a vector based on the real-time performance metrics;
   comparing the real-time performance metrics for the plurality of ISE nodes to the model for the plurality of ISE nodes by comparing the vector to each hypersurface of the n-dimensional hyperspace for the circuit;
   determining, based on the comparing, a health of the plurality of ISE nodes such that the circuit is determined to be unhealthy when the vector of the circuit is outside the bounds of at least one hypersurface of the n-dimensional hyperspace for a predetermined time period; and
   configuring the ISE system to route network traffic away from unhealthy ISE nodes.

2. The method of claim 1, wherein the historical performance metrics includes:
   a processor utilization of an ISE node in the plurality of ISE nodes;
   a network utilization of the ISE node in the plurality of ISE nodes;
   an input or output disk utilization of the ISE node in the plurality of ISE nodes;

a processor count of the ISE node in the plurality of ISE nodes;

an average load of the ISE node in the plurality of ISE nodes; and a number of active authentication, authorization, and accounting (AAA) sessions of the ISE node in the plurality of ISE nodes.

3. The method of claim 2, wherein computing the model comprises:

performing a linear regression using a number of authentication requests and the historical performance metrics; and generating a second degree polynomial relationship based on the linear regression, wherein determining the health of the plurality of ISE nodes comprises:

comparing the real-time performance metrics of the plurality of ISE nodes to the second degree polynomial relationship; and when the real-time performance metrics differs by more than a predetermined amount to the second degree polynomial relationship, determining that the plurality of ISE nodes are unhealthy.

4. The method of claim 1, wherein the historical performance metrics and the real-time performance metrics include latency, the method further comprising:

generating, from the historical performance metrics, historical latency metrics for the circuit, the circuit identifying an access flow;

computing, based on the historical latency metrics for the circuit, an individual model for the circuit representing healthy behavior for the circuit;

obtaining real-time latency metrics for the circuit;

comparing the real-time latency metrics for the circuit with the individual model for the circuit;

determining, based on the comparing for the circuit, a health of the circuit; and when the circuit is determined to be unhealthy, isolating the circuit from remaining ISE nodes in the ISE system.

5. The method of claim 4, wherein determining the health of the circuit comprises:

determining that the circuit is unhealthy based on the real-time latency metrics for the circuit being outside bounds of at least one hypersurface of the n-dimensional hyperspace for the predetermined time period.

6. The method of claim 4, further comprising:

generating a probability distribution of latency for each ISE node within the circuit;

generating, based on the probability distribution, a confidence level for each ISE node; and when the latency for an ISE node deviates by more than a predetermined amount from the confidence level, determining that the ISE node is unhealthy.

7. The method of claim 1, wherein the configuring further comprises at least one of:

routing network traffic from an unhealthy ISE node to a backup ISE node; and configuring a load balancer to route traffic from the unhealthy ISE node to the backup ISE node.

8. The method of claim 1, wherein computing the model includes:

sweeping a point vector by an angle incremented by a predetermined value, where the predetermined value is a fraction of $\pi$, for each axis in the n-dimensional hyperspace.

9. An apparatus comprising:

a communication interface configured to enable network communications;

a processing device coupled with the communication interface, and configured to:

obtain, from a plurality of identity services engine (ISE) nodes within an ISE system, historical performance metrics for the plurality of ISE nodes;

compute, based on the historical performance metrics, a model for the plurality of ISE nodes representing healthy behavior for the plurality of ISE nodes, the model described by an n-dimensional hyperspace for a circuit within the plurality of ISE nodes, where n represents a number of the historical performance metrics;

obtain, from the plurality of ISE nodes, real-time performance metrics for the plurality of ISE nodes;

generate a vector based on the real-time performance metrics;

compare the real-time performance metrics for the plurality of ISE nodes to the model for the plurality of ISE nodes by comparing the vector to each hypersurface of the n-dimensional hyperspace for the circuit;

determine, based on the comparing, a health of the plurality of ISE nodes such that the circuit is determined to be unhealthy when the vector of the circuit is outside the bounds of at least one hypersurface of the n-dimensional hyperspace for a predetermined time period; and configure the ISE system to route network traffic away from unhealthy ISE nodes.

10. The apparatus of claim 9, wherein the historical performance metrics includes:

a processor utilization of an ISE node in the plurality of ISE nodes;

a network utilization of the ISE node in the plurality of ISE nodes;

an input or output disk utilization of the ISE node in the plurality of ISE nodes;

a processor count of the ISE node in the plurality of ISE nodes;

an average load of the ISE node in the plurality of ISE nodes; and a number of active authentication, authorization, and accounting (AAA) sessions of the ISE node in the plurality of ISE nodes.

11. The apparatus of claim 10, wherein the processing device is further configured to:

perform a linear regression using a number of authentication requests and the historical performance metrics; and generate a second degree polynomial relationship based on the linear regression, compare the real-time performance metrics of the plurality of ISE nodes to the second degree polynomial relationship; and when the real-time performance metrics differs by more than a predetermined amount to the second degree polynomial relationship, determine that the plurality of ISE nodes are unhealthy.

12. The apparatus of claim 9, wherein the historical performance metrics and the real-time performance metrics include latency, the processing device is further configured to:
generate, from the historical performance metrics, historical latency metrics for the circuit, the circuit identifying an access flow;
compute, based on the historical latency metrics for the circuit, an individual model for the circuit representing healthy behavior for the circuit;
obtain real-time latency metrics for the circuit;
compare the real-time latency metrics for the circuit with the individual model for the circuit;
determine, based on the comparing for the circuit, a health of the circuit; and
when the circuit is determined to be unhealthy, isolate the circuit from remaining ISE nodes in the ISE system.

13. The apparatus of claim 12, wherein the processing device is further configured to determine the health of the circuit by:
determining that the circuit is unhealthy based on the real-time latency metrics for the circuit being outside bounds of at least one hypersurface of the n-dimensional hyperspace for the predetermined time period.

14. The apparatus of claim 12, wherein the processing device is further configured to:
generate a probability distribution of latency for each ISE node within the circuit;
generate, based on the probability distribution, a confidence level for each ISE node; and
when the latency for an ISE node deviates by more than a predetermined amount from the confidence level, determine that the ISE node is unhealthy.

15. One or more non-transitory computer readable storage media encoded with instructions that, when executed by a processor, cause the processor to:
obtain, from a plurality of identity services engine (ISE) nodes within an ISE system, historical performance metrics for the plurality of ISE nodes;
compute, based on the historical performance metrics, a model for the plurality of ISE nodes representing healthy behavior for the plurality of ISE nodes, the model described by an n-dimensional hyperspace for a circuit within the plurality of ISE nodes, where n represents a number of the historical performance metrics;
obtain, from the plurality of ISE nodes, real-time performance metrics for the plurality of ISE nodes;
generating a vector based on the real-time performance metrics;
compare the real-time performance metrics for the plurality of ISE nodes to the model for the plurality of ISE nodes by comparing the vector to each hypersurface of the n-dimensional hyperspace for the circuit;
determine, based on the comparing, a health of the plurality of ISE nodes, such that the circuit is determined to be unhealthy when the vector of the circuit is outside the bounds of at least one hypersurface of the n-dimensional hyperspace for a predetermined time period; and
configure the ISE system to route network traffic away from unhealthy ISE nodes.

16. The one or more non-transitory computer readable storage media of claim 15, wherein the historical performance metrics includes:
a processor utilization of an ISE node in the plurality of ISE nodes;
a network utilization of the ISE node in the plurality of ISE nodes;
an input or output disk utilization of the ISE node in the plurality of ISE nodes;
a processor count of the ISE node in the plurality of ISE nodes;
an average load of the ISE node in the plurality of ISE nodes; and
a number of active authentication, authorization, and accounting (AAA) sessions of the ISE node in the plurality of ISE nodes.

17. The one or more non-transitory computer readable storage media of claim 16, wherein the instructions further cause the processor to:
perform a linear regression using a number of authentication requests and the historical performance metrics; and
generate a second degree polynomial relationship based on the linear regression,
compare the real-time performance metrics of the plurality of ISE nodes to the second degree polynomial relationship; and
when the real-time performance metrics differs by more than a predetermined amount to the second degree polynomial relationship, determine that the plurality of ISE nodes are unhealthy.

18. The one or more non-transitory computer readable storage media of claim 15, wherein the historical performance metrics and the real-time performance metrics include latency, wherein the instructions further cause the processor to:
generate, from the historical performance metrics, historical latency metrics for the circuit, the circuit identifying an access flow;
compute, based on the historical latency metrics for the circuit, an individual model for the circuit representing healthy behavior for the circuit;
obtain real-time latency metrics for the circuit;
compare the real-time latency metrics for the circuit with the individual model for the circuit;
determine, based on the comparing for the circuit, a health of the circuit; and
when the circuit is determined to be unhealthy, isolate the circuit from remaining ISE nodes in the ISE system.

19. The one or more non-transitory computer readable storage media of claim 18, wherein the instructions cause the processor to determine the health of the circuit by:
determining that the circuit is unhealthy based on the real-time latency metrics for the circuit being outside bounds of at least one hypersurface of the n-dimensional hyperspace for the predetermined time period.

20. The one or more non-transitory computer readable storage media of claim 15, wherein the instructions further cause the processor to:
route network traffic from an unhealthy ISE node to a backup ISE node; and
configure a load balancer to route traffic from the unhealthy ISE node to the backup ISE node.

* * * * *